United States Patent
Loveland et al.

(10) Patent No.: US 9,775,218 B2
(45) Date of Patent: *Sep. 26, 2017

(54) SYSTEMS AND METHODS FOR MANAGING INTERACTION WITH CONTROLLABLE LIGHTING NETWORKS

(71) Applicant: PHILIPS LIGHTING HOLDING B.V., Eindhoven (NL)

(72) Inventors: Damien Gerard Loveland, Richmond (CA); Arend Jan Wilhelmus Abraham Vermeulen, Drachtster Compagnie (NL); Ian Edward Ashdown, West Vancouver (CA)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,791

(22) Filed: Dec. 4, 2015

(65) Prior Publication Data

US 2016/0088716 A1 Mar. 24, 2016

Related U.S. Application Data

(63) Continuation of application No. 13/381,381, filed as application No. PCT/IB2010/052742 on Jun. 17, 2010, now Pat. No. 9,213,324.
(Continued)

(51) Int. Cl.
*H04Q 7/10* (2006.01)
*H05B 37/02* (2006.01)
(Continued)

(52) U.S. Cl.
CPC ......... *H05B 37/0245* (2013.01); *G05B 15/02* (2013.01); *H04L 12/2829* (2013.01);
(Continued)

(58) Field of Classification Search
CPC ..... H05B 37/0245; H04W 4/02; H04W 4/021
(Continued)

(56) References Cited

U.S. PATENT DOCUMENTS 6,348,867 B1 * 2/2002 Myllymaki ........ G08B 21/0423
340/506
2003/0227439 A1 12/2003 Lee et al.
(Continued)

FOREIGN PATENT DOCUMENTS

JP 1994019616 A 1/1994
JP 2002534841 A 10/2002
(Continued)

*Primary Examiner* — Ajit Patel
*Assistant Examiner* — Julio Perez
(74) *Attorney, Agent, or Firm* — Meenakshy Chakravorty (57) ABSTRACT

Systems and methods for managing interaction with controllable lighting networks are disclosed. Particularly, a user's input regarding the user's preferred level of interaction with a controllable lighting network is used in conjunction with memories and processors, to selectively allow the controllable lighting network access to the user's personal data such as the user's identity or the user's personal lighting preferences. A user's preferred level of interaction with a controllable lighting network is also used, in conjunction with personal mobile electronic communication devices, to allow the user to control lighting within controllable lighting networks.

17 Claims, 5 Drawing Sheets

Related U.S. Application Data (60) Provisional application No. 61/221,580, filed on Jun. 30, 2009.

(51) Int. Cl.
*G05B 15/02* (2006.01)
*H04L 12/28* (2006.01)
*H04L 29/06* (2006.01)
*H05B 33/08* (2006.01)
*H04L 29/08* (2006.01)

(52) U.S. Cl.
CPC ............ *H04L 63/08* (2013.01); *H04L 63/102* (2013.01); *H04L 67/125* (2013.01); *H05B 33/0854* (2013.01); *H05B 37/029* (2013.01); *H05B 37/0227* (2013.01); *H04L 67/306* (2013.01); *H04L 2012/285* (2013.01)

(58) Field of Classification Search
USPC ................................ 455/456.3, 456.2, 456.1
See application file for complete search history.

(56) References Cited

U.S. PATENT DOCUMENTS

| | | |
|---|---|---|
| 2007/0173978 A1 | 7/2007 | Fein et al. |
| 2008/0313556 A1 | 12/2008 | Zhang et al. |
| 2009/0187975 A1* | 7/2009 | Edwards, Jr. ........... G06F 21/31 726/4 |
| 2009/0300741 A1 | 12/2009 | Greenwood et al. |
| 2010/0181938 A1* | 7/2010 | Boleko Ribas .... H05B 37/0245 315/312 |
| 2012/0320272 A1* | 12/2012 | Schmehl ................ G08C 17/02 348/563 |
| 2012/0326835 A1 | 12/2012 | Cockrell et al. |
| 2014/0001977 A1 | 1/2014 | Zacharchuk et al. |
| 2014/0066103 A1 | 3/2014 | Das et al. |

FOREIGN PATENT DOCUMENTS

| | | |
|---|---|---|
| JP | 2004030933 A | 1/2004 |
| JP | 2008016289 A | 1/2008 |
| JP | 1993035877 B2 | 9/2012 |
| WO | 0039964 A1 | 7/2000 |
| WO | 2008104927 A2 | 9/2008 |
| WO | 2008139360 A | 11/2008 |

* cited by examiner

FIG. 5 understand# SYSTEMS AND METHODS FOR MANAGING INTERACTION WITH CONTROLLABLE LIGHTING NETWORKS

CROSS-REFERENCE TO PRIOR APPLICATIONS

This application is a continuation of U.S. patent application Ser. No. 13/381,381, filed on Mar. 27, 2012, which is a U.S. National Phase application under 35 U.S.C. §371 of International Application No. PCT/IB2010/052742, filed on Jun. 17, 2010, which claims the benefit of U.S. Provisional Patent Application No. 61/221,580, filed on Jun. 30, 2009. These applications are hereby incorporated by reference herein.

TECHNICAL FIELD

The present invention generally relates to systems and methods for managing interaction with controllable lighting networks. More particularly, the present invention is directed at systems and methods for determining preferred levels of interactivity with a controllable lighting network, for exercising control over the network's access to user information, for exercising control over the network's reaction to a user's presence, and for communicating changes in user preferences to the network.

BACKGROUND

Digital lighting technologies, i.e. illumination based on semiconductor light sources, such as light-emitting diodes (LEDs), today offer a viable alternative to traditional fluorescent, HID, and incandescent lamps. Recent advances in LED technology coupled with its many functional advantages such as high energy conversion and optical efficiency, durability, and lower operating costs, has led to the development of efficient and robust full-spectrum lighting sources that enable a variety of lighting effects. For example, fixtures embodying these lighting sources may include one or more LEDs capable of producing different colors, e.g. red, green, and blue, as well as a processor for independently controlling the output of the LEDs in order to generate a variety of colors and color-changing lighting effects, as discussed in U.S. Pat. Nos. 6,016,038 and 6,211,626, incorporated herein by reference.

Controllable lighting networks and systems include lighting management systems utilizing digital technologies in order to control the lighting in one or more spaces. Controllable lighting networks and systems may control luminaires in a space based on the personal lighting preferences of individuals detected within or otherwise associated with a space. Many controllable lighting networks and systems utilize sensor systems to receive information about the spaces under their influence. Such information may include the identities of individuals detected within such spaces as well as the personal lighting preferences associated with such individuals.

Controllable lighting networks and systems may access user preference data such as users' lighting preferences and control the lighting within a space to reflect individual preferences. While some users may wish to allow such systems unrestricted access to such personal data, others may wish to exercise some degree of control over the kind of personal information available to controllable lighting networks. Still others may simply wish to prevent such systems from reacting to their presence despite having access to their personal data. For example, a security guard may wish to prevent a controllable lighting system from responding to his or her presence when patrolling a building, to avoid alerting an intruder. Moreover, users may wish to grant particular controllable lighting systems access to personal information, while restricting access to other such systems. Similarly, users may want controllable lighting networks and systems to react to their presence at certain times of the day, and ignore their presence at all other times.

Currently, there exists no convenient means for users to exercise control over a controllable lighting system's access to personal information such as personal lighting preference information. Moreover, there currently exists no convenient means by which users may exercise control over such a system's reaction to their presence. There also exists no convenient means for users to interactively influence the reaction of controllable lighting systems while such users are present within regions controlled by such systems. For example, a user walking into a room has no convenient means of communicating a change in his or her lighting preferences to the controllable lighting system responsible for controlling the lighting in the room based on his or her preferences. This ability to dynamically alter lighting preference information and timely alert controllable lighting systems of such alterations is important, however, because it enables users to incorporate previously unavailable information to update their lighting preferences. For example, a user who is physically present in a room has the benefit of using additional information, such as the amount of natural light present in the room, to determine how much additional artificial light he or she prefers.

As a result, there exists a need in the art for systems and methods for managing interaction with controllable lighting networks and systems. More particularly, there exists a need in the art for systems and apparatus for determining preferred levels of interactivity with controllable lighting networks and systems, for exercising control over such systems' access to user information, for exercising control over such systems' reaction to user presence, and for communicating changes in user preferences to such systems.

SUMMARY

Applicants herein recognized that, although there is a dearth of systems and methods for managing interaction with controllable lighting networks and systems, users of such controllable lighting system do not currently have the ability to (1) exercise control over the controllable lighting system's access to their personal information such as their personal lighting preference data, (2) exercise control over the controllable lighting system's reaction to their presence, and (3) interactively communicate changes in personal lighting preferences to the controllable lighting system. Applicants further recognized that providing users of controllable lighting systems with such abilities would not only enable users of such systems to better protect the privacy of their personal information, but also enable controllable lighting systems to better service the needs of their users. Consequently, the present invention is directed to systems and apparatus for managing interaction with controllable lighting networks and systems.

Embodiments of the present invention include systems for managing interaction with controllable lighting systems. For example, in various embodiments, a user of a controllable lighting system may select an interactivity level. The interactivity level selected may indicate that the controllable lighting system or network may access only a small subset of the preference data associated with the user. According to such embodiments, any subset of a user's preference data is only made available to the controllable lighting network, after a processor accesses the user's selected interactivity level, and determines that the user's selected interactivity level authorizes the subset of the user preference data to be made available to the controllable lighting network.

Many embodiments of the invention receive communication from personal mobile electronic communication devices that enable users to specify preferred interactivity levels, while on the move. According to embodiments of the invention, applications may be launched on personal mobile electronic communication devices associated with users. The applications may comprise user interfaces for presenting one or more options designed to allow a user to specify a preferred level of interactivity with controllable lighting networks. By selecting one of the presented options, the user may, in various embodiments, exercise control over the kinds of personal information transmitted to controllable lighting networks.

Many embodiments of the present invention also receive communications from personal mobile electronic communication devices that allow users to change their personal preferences regarding controllable lighting networks. According to various embodiments, an application may be launched on a personal mobile electronic communication device. The application may comprise one or more user interfaces for allowing users to modify their lighting preference data. In various embodiments, such applications may also comprise user interfaces for allowing users to select and control one or more luminaires associated with a controllable lighting network.

Generally, according to many embodiments of the invention, a system for managing interaction with controllable lighting networks includes a memory and a processor. The memory associates a user identifier with user preference data including a selected interactivity level. The processor retrieves from the memory the user preference data associated with the user identifier, checks which user preference data the selected interactivity level authorizes for transmission to a controllable lighting network, and generates a signal indicative of the user preference data authorized for transmission to the controllable lighting network by the selected interactivity level. The system according to some embodiments further includes a communication link for transmitting the signal indicative of the authorized user preference data to the controllable lighting network.

According to many aspects of the invention, the selected interactivity level is selected from a group consisting of: an OFF level denying the controllable lighting network access to the user identifier and the user preference data; an IGNORE level granting the controllable lighting network access to the user identifier, denying the controllable lighting network access to the user preference data, and indicating that the controllable lighting network shall not control lighting based on the presence of the user; a PERSONAL level granting the controllable lighting network access to both the user identifier and the user preference data, and indicating that the controllable lighting network should control the lighting in the vicinity of the user based on the user preference data associated with the user; a BROADCAST level granting the controllable lighting network access to both the user identifier and the user preference data, and indicating that the controllable lighting network should control the lighting within a region associated with the controllable lighting network based on the user preference data associated with the user; and an ADJUST level granting the controllable lighting network access to both the user identifier and the user preference data, indicating that the user may control the lighting within a region associated with the controllable lighting network, and additionally indicating that the user may alter the one or more user preference data. Embodiments of the invention may use different identifiers for the interactivity levels described above.

According to many aspects of the invention, the system for managing interaction with controllable lighting networks further includes a localization system determining user location data associated with a user, and transmitting a signal indicative of the user location data. The processor associated with the larger system receives the signal indicative of the user location data and extracts the user location data from the signal. The processor also checks whether the selected interactivity level authorizes the user location data for transmission to the controllable lighting network, and generates a signal indicative of the user location data if authorized by the selected interactivity level. According to many aspects of the invention, the localization system determines the user location data using technologies comprising: triangulation, accelerometer technology, GPS technology, and A-GPS technology.

According to various aspects of the invention, the system for managing interaction with controllable lighting networks further receives information from a personal mobile electronic communication device proximate to the user. According to such aspects, the localization system determines location related data associated with the personal mobile electronic communication device, and determines location data associated with the user using the location related data associated with the personal mobile electronic communication device.

In many aspects of the invention, the system for managing interaction with controllable lighting networks further includes a presence detection system detecting the controllable lighting network. According to some aspects of the invention, a lighting control application is launched on a personal mobile electronic communication device upon the presence detection system detecting the controllable lighting network. The lighting control application comprises one or more user interfaces for modifying the user preference data and the lighting control application receives user-specified data including modified user preference data. The lighting control application thereafter transmits a first signal indicative of the user-specified data. The processor, according to many aspects of the invention, receives the first signal, extracts the user-specified data, updates the user preference data in the memory using the user-specified data, checks which user preference data the selected interactivity level authorizes for transmission to a controllable lighting network, and generates a signal indicative of the user preference data authorized for transmission to the controllable lighting network by the selected interactivity level.

In many aspects of the invention, the lighting control application further includes one or more user interfaces for controlling one or more luminaires associated with the controllable lighting network. The lighting control application, receives, as a result of user interaction with the one or more user interfaces, user-specified data comprising data indicative of one or more luminaires and one or more preferred illumination settings associated with the one or more luminaires. According to some aspects of the invention, the processor receives the first signal, extracts the user-specified data, checks whether the selected interactivity level authorizes alteration of luminaire settings by the user, and generates a signal indicative of the user-specified data for transmission to the controllable lighting network if alteration of luminaire settings is authorized by the selected interactivity level.

According to many embodiments of the invention, a system for managing interaction with controllable lighting networks includes a localization system, an identification system, a memory, and a processor. The localization system determines location data associated with a user and transmits a first signal indicative of the user's location data. The identification system determines a user identifier associated with the user and transmits a second signal indicative of the user identifier. The memory associates the user identifier with the user preference data. The processor receives the first signal and extracts the user's location data from the first signal. The processor also receives the second signal and extracts the user identifier from the second signal. The processor then retrieves from the memory the user preference data associated with the user identifier, checks which user preference data the selected interactivity level authorizes for transmission to a controllable lighting network, and generates a signal indicative of the user preference data authorized for transmission to the controllable lighting network by the selected interactivity level.

Generally, according to various embodiments of the invention, a method for managing interaction with controllable lighting networks includes the following steps: presenting a selection of preference data on a personal mobile electronic communication device; receiving modified preference data associated with the presented selection of preference data; transmitting the modified preference data to a processor; the processor checking a memory for an authorization to transmit the modified preference data to a controllable lighting network; and transmitting the modified preference data to the controllable lighting network if the authorization to transmit the modified preference data to the controllable lighting network exists.

DETAILED DESCRIPTION

Figure 1:
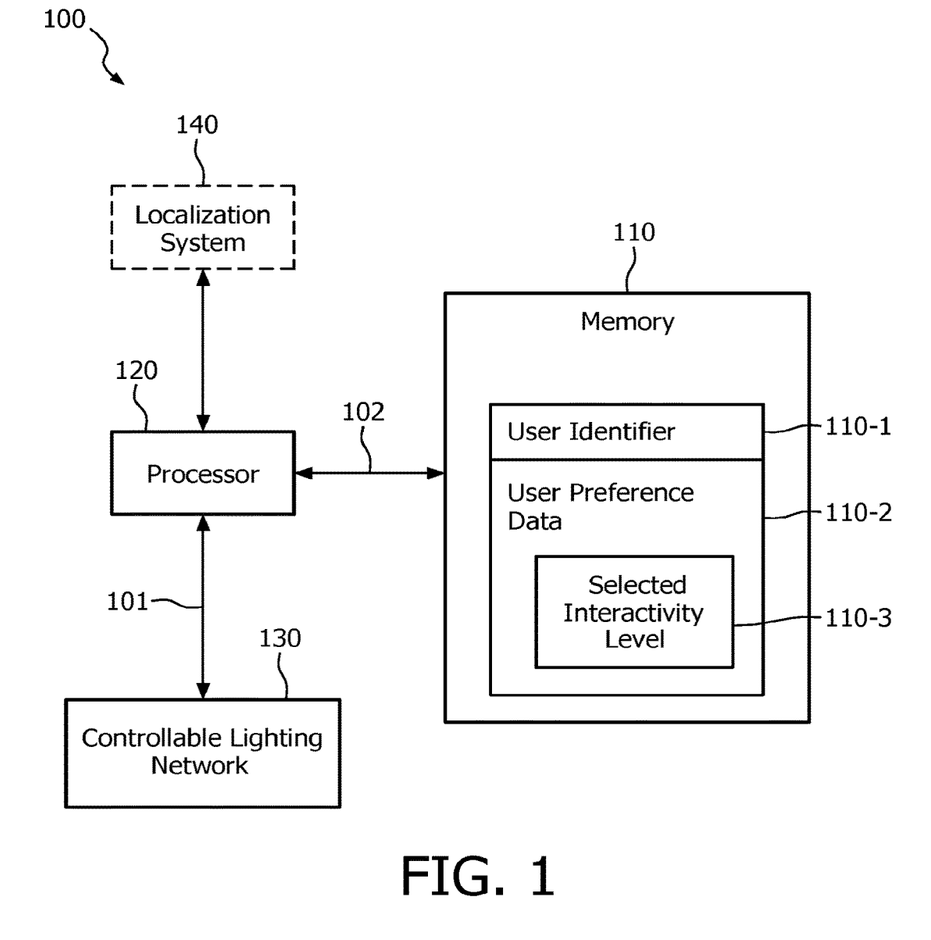
FIG. 1 illustrates a system for managing interaction with a controllable lighting network according to embodiments of the invention.

FIG. 1 illustrates a system 100 for managing interaction with a controllable lighting network according to the invention. System 100 includes memory 110, and processor 120. System 100 may further include controllable lighting network 130. Memory 110 associates user identifiers with user preference data. For example, memory 110 associates a user's preference data 110-2 with the user's identifier 110-1. According to many embodiments of system 100, user preference data 110-2 includes the associated user's selected interactivity level 110-3.

Embodiments of memory 110 include various types of storage media, e.g., volatile and non-volatile computer memory such as RAM, PROM, EPROM and EEPROM, floppy disks, compact disks, optical disks, magnetic tape. In some implementations, the storage media may be encoded with one or more programs capable of being executed on a processor. Various storage media may be transportable, such that the one or more programs stored thereon can be loaded into a processor so as to implement various aspects of the present invention discussed herein. The terms "program" or "computer program" are used herein to refer to any type of computer code (e.g. software or microcode) that can be executed on one or more processors.

Embodiments of controllable lighting network 130 include lighting management systems utilizing digital technologies in order to intelligently control lighting in one or more spaces. For example, suitable lighting networks, controlling a plurality of luminaires in a space based on lighting preferences associated with individuals detected within or otherwise associated with the space, are disclosed in a co-pending International Application No. PCT/IB2009/052811, entitled "Intelligent Controllable Lighting Networks and Schemata Therefor" and filed on Jun. 29, 2009, incorporated herein by reference.

User preference data 110-2 may include, but is not limited to, any data related to a user's lighting preferences. For example, the user preference data may include data indicative of how brightly lit the associated user prefers his workspace to be. The user preference data may also include selected interactivity level 110-3. Selected interactivity level 110-3 is an interactivity level that may be used for controlling the reaction of controllable lighting network 130 to the presence of a user within a region under the influence of controllable lighting network 130. Selected interactivity level 110-3 may also be used to control the transmission of user related data, such as user preference data 110-2 to controllable lighting network 130.

Processor 120 retrieves, via link 102, from memory 110, user preference data 110-2 associated with user identifier 110-1, and determines which user preference data included within user preference data 110-2 is authorized for transmission to controllable lighting network 130 by the selected interactivity level 110-3. Processor 120 may also generate a signal indicative of the user preference data authorized by selected interactivity level 110-3 for transmission to controllable lighting network 130. Many embodiments of system 100 may additionally comprise a link 101 for communicating the signal indicative of the authorized user preference data to controllable lighting network 130.

The term "link" as used herein refers to any connection that enables the communication of information between at least two entities. For example, a link includes a wired communications connection, a wireless communications connection, a radio frequency communications connection, and an optical communications connection.

The term "processor" as used herein refers to any circuitry that processes arithmetic and logic instructions, such as a central processing unit of a computer capable of manipulating information. Embodiments of processor 120 include, but are not limited to, conventional microprocessors, application specific integrated circuits (ASICs), and field-programmable gate arrays (FPGAs).

According to many embodiments of system 100, the user associated with user identifier 110-1 may select an interactivity level 110-3 from a group consisting of: an OFF level denying controllable lighting network 130 access to user identifier 110-1 and to user preference data 110-2; an IGNORE level granting controllable lighting network 130 access to user identifier 110-1, denying controllable lighting network 130 access to user preference data 110-2, and indicating that controllable lighting network 130 shall not control lighting based on the presence of the user associated with user identifier 110-1; a PERSONAL level granting controllable lighting network 130 access to both user identifier 110-1 and user preference data 110-2, and indicating that controllable lighting network 130 should control the lighting in the vicinity of the user associated with user identifier 110-1 based on user preference data 110-2; a BROADCAST level granting controllable lighting network 130 access to both user identifier 110-1 and user preference data 110-2, and indicating that controllable lighting network 130 should control lighting within a region associated with controllable lighting network 130 based on user preference data 110-2; and an ADJUST level granting controllable lighting network 130 access to both user identifier 110-1 and user preference data 110-2, indicating that the user associated with user identifier 110-1 may control lighting within a region associated with controllable lighting network 130, and additionally indicating that the user associated with user identifier 110-1 may alter user preference data 110-2. The user may select an interactivity level using a user interface displayed by an application. The user interface may be textual, graphical, speech-based or based on any other modalities. The user interface may be displayed on a personal mobile electronic communications, such as a BLACKBERRY device or an IPHONE device, carried by the user.

Some embodiments of system 100 may further include a localization system 140 for determining user location data associated with the user who is associated with user identifier 110-1, and for transmitting a signal indicative of the user location data. The localization system may be implemented in numerous ways (e.g. such as with dedicated hardware, software, or a combination of hardware and software) to perform various functions discussed herein. The localization system may be implemented with or without employing a processor, and also may be implemented as a combination of dedicated hardware to perform some functions and a processor (e.g., one or more programmed microprocessors and associated circuitry) to perform other functions. The localization system may also be implemented using a plurality of modules designed to perform specific functions and to communicate information internally within the localization system as well as with external entities.

According to various embodiments of system 100, localization system 140 may determine the user location data using technologies comprising: triangulation, accelerometer technology, GPS technology, and A-GPS technology. Determining user location data using triangulation may comprise comparing one or more signal arrival times as well as comparing one or more signal strengths.

Processor 120, according to various embodiments, may receive a signal indicative of the user location data from localization system 140, extract the user location data from the signal, and check whether the selected interactivity level 110-3 authorizes transmission of the user location data to controllable lighting network 130. Processor 120 may also generate a signal indicative of the user location data if the user location data is authorized for transmission to controllable lighting network 130 by selected interactivity level 110-3.

In various embodiments of system 100, the localization system 140 may further determine a gaze direction associated with the user associated with user identifier 110-1. The localization system may determine the gaze direction by utilizing technologies comprising orientation sensors and technologies for tracking the pupil of the user associated with user identifier 110-1. The localization system may also transmit a signal indicative of the gaze direction. According to such embodiments, processor 120 may receive the signal indicative of the gaze direction, may extract the gaze direction from the signal, and may check whether selected interactivity level 110-3 authorizes transmission of the gaze direction to controllable lighting network 130. Processor 120 and may also generate a signal indicative of the gaze direction if authorized by selected interactivity level 110-3.

Figure 2:
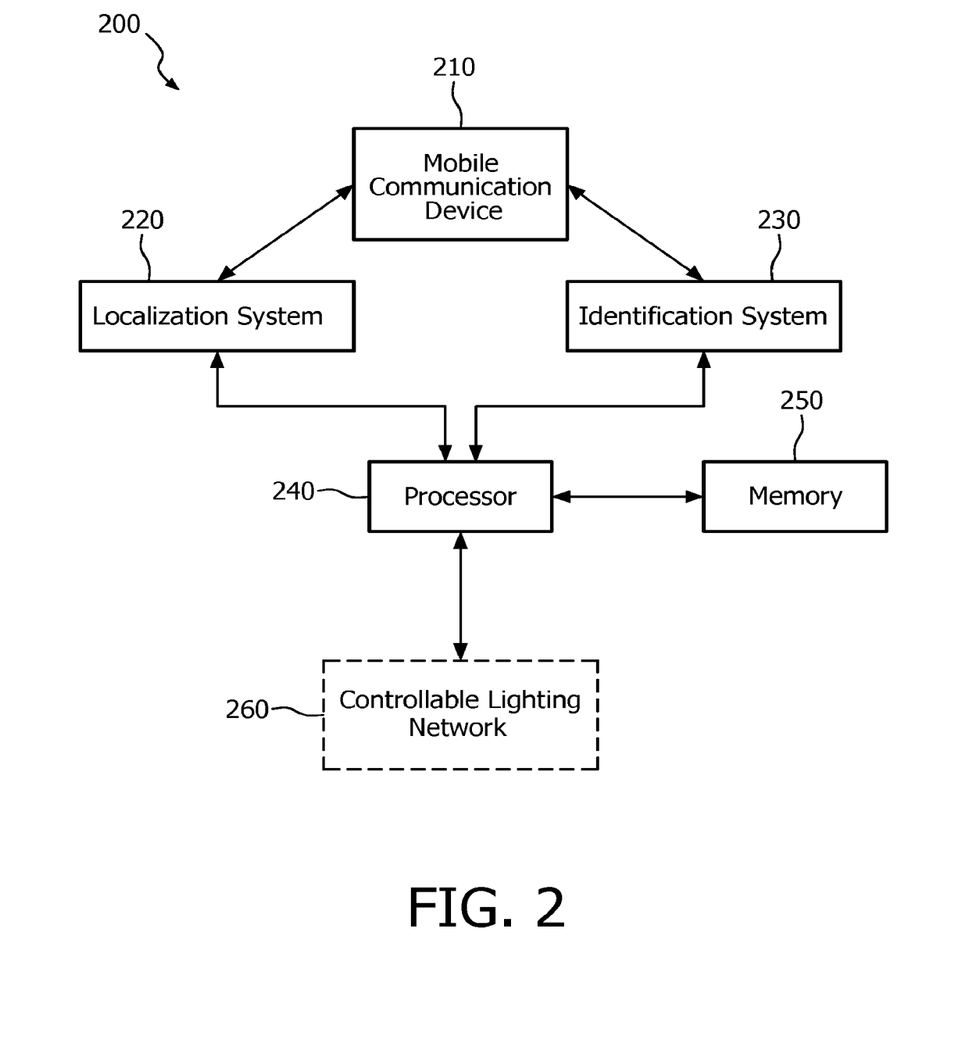
FIG. 2 illustrates a system for managing interaction with a controllable lighting network according to embodiments of the invention that include personal mobile electronic communication devices.

FIG. 2 illustrates a system 200 for managing interaction with a controllable lighting network according to embodiments of the invention. System 200 includes a localization system 220 and an identification system 230, in addition to a processor 240, and memory 250. Embodiments of the invention may include the localization system 220 but no identification system 230. The localization system 220 and the identification system 230 interact with a personal mobile electronic communication device 210. Like system 100, system 200 may additionally comprise controllable lighting network 260. Controllable lighting network 260 may be any type of controllable lighting network described with respect to controllable lighting network 130 of FIG. 1.

Identification system 230 may be implemented in numerous ways (e.g. such as with dedicated hardware, software, or a combination of hardware and software) to perform various functions discussed herein. The identification system may be implemented with or without employing a processor, and also may be implemented as a combination of dedicated hardware to perform some functions and a processor (e.g., one or more programmed microprocessors and associated circuitry) to perform other functions. The identification system may also be implemented using a plurality of modules designed to perform specific functions and to communicate information internally within the identification system, as well as with external entities.

Identification system 230 determines a user identifier associated with a user, determines a selected interactivity level associated with the user, and transmits a signal indicative of the user identifier. The identification system may also transmit another signal indicative of the selected interactivity level associated with the user. According to various embodiments of system 200, the identification system may determine the user identifier associated with the user by utilizing techniques for recognizing unique characteristics of the user and checking a second memory for a user identifier associated with the unique characteristics. Unique characteristics of users may include characteristics related to fingerprints or faces.

Processor 240 receives the signal indicative of the user identifier and extracts the user identifier from the signal. The processor may also receive the signal indicative of the selected interactivity level and extract the selected interactivity level from the signal. Processor 240 may additionally update, in memory 250, the selected interactivity level associated with the extracted user identifier using the extracted selected interactivity level. Processor 240 may be any type of processor described with respect to processor 120 of FIG. 1. Memory 250 may be any type of memory described with respect to memory 110 of FIG. 1.

Personal mobile electronic communication device (personal device) 210, according to many embodiments of system 200, is in signal communication with localization system 220 and identification system 230. Exemplary embodiments of personal device include a mobile phone, a SMS device, a personal digital assistant, a BLACKBERRY device, a IPHONE device, and a device including a programmable RFID tag. In some embodiments of system 200, personal device 210 may include processor 240.

In some embodiments, localization system 220 determines location-related data associated with the personal mobile electronic communication device 210 as a result of the personal device transmitting information indicative of its location. Localization system 220 may determine data indicative of the user's location based on the location-related data associated with personal mobile electronic communication device 210. Moreover, the localization system may determine data indicative of the user's location by, for example, periodically polling one or more Wi-Fi access points, receiving data indicative of one or more identities corresponding to one or more Wi-Fi access points, receiving data associating the one or more received identities with one or more signal strengths, and using the signal strengths corresponding to each of the one or more Wi-Fi access points to determine data indicative of the user's location. In some embodiments of system 200, personal device 210 includes localization system 220. For example, personal device 210 may execute on a processor one or more modules that are part of localization system 220. Localization system 220 may be any type of localization system described previously with respect to system 100.

Figure 3:
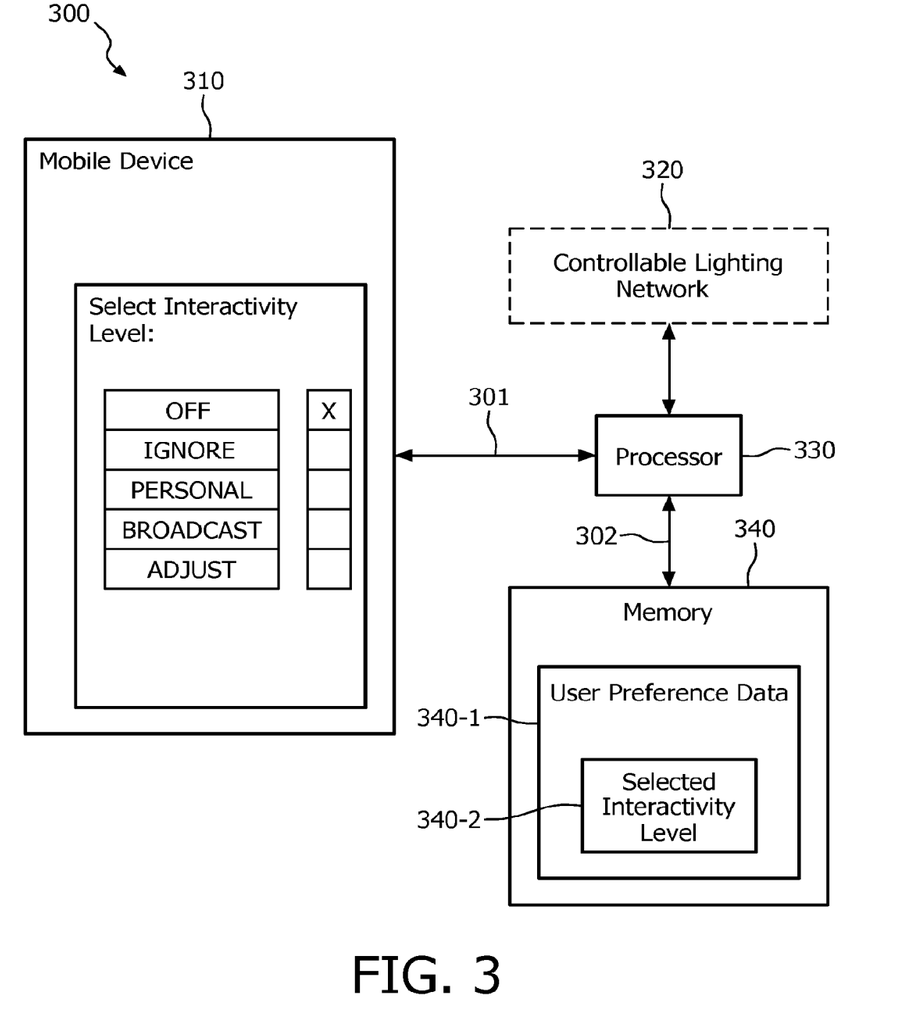
FIG. 3 illustrates a system for managing interaction with a controllable lighting network according to embodiments of the invention that enable personal mobile electronic communication devices to display lighting control applications.

FIG. 3 illustrates a system 300 for managing interaction with a controllable lighting network according to embodiments of the invention. System 300 includes personal mobile electronic communication device (personal device) 310 associated with a user, a processor 330, and a memory 340. System 300 may also include controllable lighting network 320. Memory 340 includes user preference data 340-1, such as a selected interactivity level 340-2 and other data. Personal device 310 may be any type of personal mobile electronic communication device described with respect to personal device 210 of FIG. 2. Processor 330 may be any type of processor described with respect to processor 120 of FIG. 1. Memory 340 may be any type of memory described with respect to memory 110 of FIG. 1. Likewise, controllable lighting network 320 may be any type of controllable lighting network described with reference to controllable lighting network 130 of FIG. 1

In many embodiments of system 300, a lighting control application is launched on personal device 310. The lighting control application may be launched by a processor executing computer code that is part of the lighting control application. The processor executing the computer code may or may not be a part of personal device 310. The lighting control application may be launched on personal device 310 upon a presence detection system detecting controllable lighting network 320 in the vicinity of personal device 310. The presence detection system may detect controllable lighting network 320 in the vicinity of the personal device by, for example, periodically checking a database or other memory that associates various controllable lighting networks with geographic locations. In some embodiments of system 300, user preference data 340-1 may comprise a set of controllable lighting networks known or trusted by the user associated with user preference data 340-1. The presence detection system may detect controllable lighting network 320 in the vicinity of personal device 310 by additionally identifying controllable lighting network 320 in the set of known or trusted controllable lighting networks referenced by the user's preference data 340-1. Personal device 310 may, in some embodiments of system 300, comprise the presence detection system.

The presence detection system described above with respect to embodiments of system 300, may be implemented in numerous ways (e.g. such as with dedicated hardware, software, or a combination of hardware and software) to perform various functions discussed herein. The presence detection system may be implemented with or without employing a processor, and also may be implemented as a combination of dedicated hardware to perform some functions and a processor (e.g., one or more programmed microprocessors and associated circuitry) to perform other functions. The presence detection system may also be implemented using a plurality of modules designed to perform specific functions and to communicate information internally within the presence detection system as well as with external entities.

The lighting control application may include, as illustrated in FIG. 3, a user interface for allowing a user to modify user preference data, such as the user's selected interactivity level and the user's lighting preferences. The lighting control application may receive, as a result of a user interacting with its user interface, user-specified data comprising modified user preference data. In response, the lighting control application may transmit, via link 301, a first signal indicative of the user-specified data. Processor 330 may receive the first signal via link 301, extract the user-specified data, and update, via link 302, user preference data 340-1 in memory 340. Processor 330 may update user preference data 340-1 in memory 340 by using the modified user preference data included within the extracted user-specified data. The processor may then check which of the user preference data 340-1 is authorized for transmission to controllable lighting network 320 by selected interactivity level 340-2. Processor 330 may also generate, for transmission to controllable lighting network 320, a signal indicative of the user preference data authorized for such transmission.

The term "lighting control application" generally refers to one or more software programs that relate to the control of luminaires associated with one or more controllable lighting networks. Lighting control applications may be executed on one or more processors, including but not limited to, processor 330 or any processor within personal device 310.

The term "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "light source" should be understood to refer to any one or more of a variety of radiation sources, including, but not limited to, LED-based sources, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyroluminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

Figure 4:
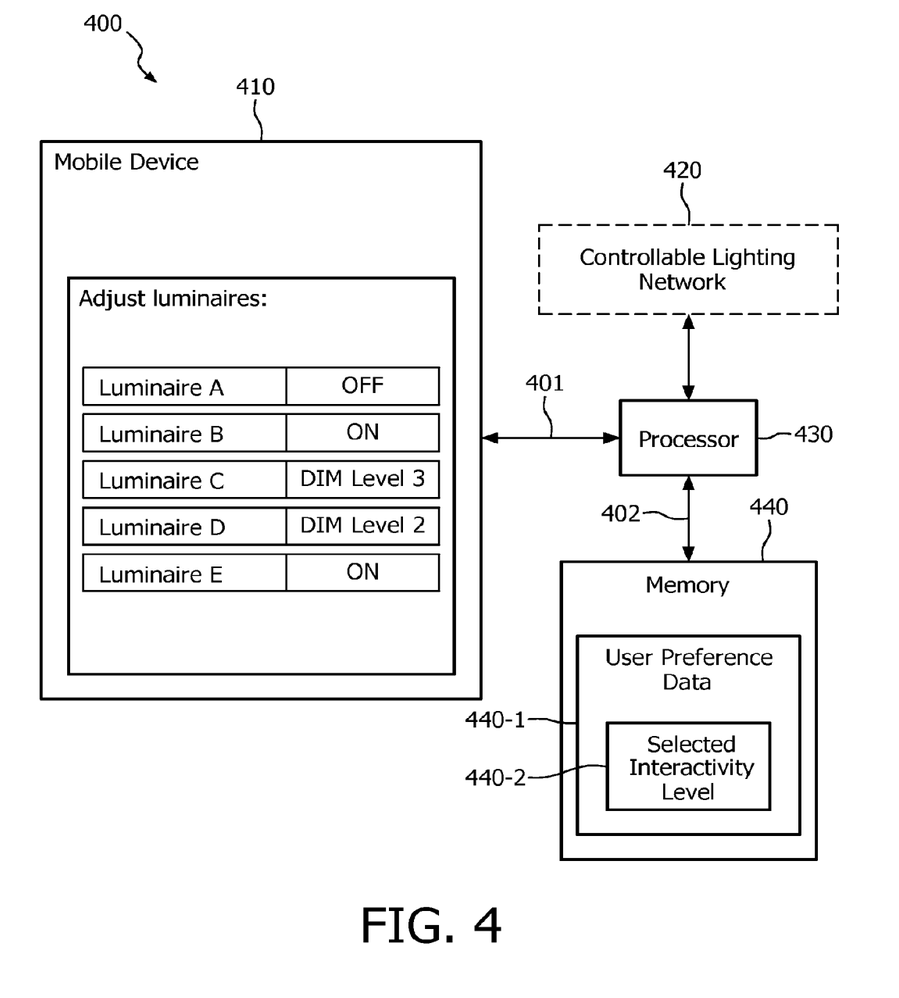
FIG. 4 illustrates a system for managing interaction with a controllable lighting network according to embodiments of the invention that enable personal mobile electronic communication devices to display lighting control applications.

FIG. 4 illustrates a system 400 for managing interaction with a controllable lighting network according to embodiments of the invention. System 400 includes personal mobile electronic communication device (personal device) 410, processor 430, and memory 440. System 400 may also comprise controllable lighting network 420. Memory 440 comprises user preference data 440-1, which in turn comprises selected interactivity level 440-2. According to many embodiments of system 400, a lighting control application is launched on personal device 410 upon a presence detection system detecting controllable lighting network 420 in the vicinity of personal device 410.

Processor 430 may be any type of processor described with respect to processor 120 of FIG. 1. Memory 440 may be any type of memory described with respect to memory 110 of FIG. 1. Controllable lighting network 420 may be any type of controllable lighting network described with respect to controllable lighting network 130 of FIG. 1. Personal device 410 may be any type of personal mobile electronic communication device described with respect to personal device 310 of FIG. 3.

The presence detection system may any type of presence detection system described with respect to FIG. 3. The lighting control application may likewise be any type of lighting control application described with respect to FIG. 3. Personal device 410 may, according to some embodiments of system 400, comprise the presence detection system.

The lighting control application may include, as illustrated in FIG. 4, a user interface for controlling one or more luminaires associated with controllable lighting network 420. A user may utilize the user interface for specifying how the user wishes to adjust illumination provided by one or more luminaires associated with controllable lighting network 420. The one or more luminaires may comprise any type of luminaire described above with respect to FIG. 3. As a result of a user interacting with the user interface, the lighting control application may receive user-specified data comprising, for example, data indicative of one or more luminaires associated with the controllable lighting network, and data indicative of one or more preferred illumination settings associated with the one or more luminaires. In response, the lighting control application may transmit a first signal indicative of the user-specified data via link 401. Processor 430 may receive the first signal via link 401, and extract the user-specified data. Processor 430 may also check memory 440, via link 402, to determine whether selected interactivity level 440-2 associated with the user's preference data 440-1, authorizes the user to alter the illumination settings of luminaires associated with controllable lighting network 420. If the alteration of illumination settings of luminaires associated with controllable lighting network 420 is authorized by the user's selected interactivity level 440-2, the processor may additionally generate a signal indicative of the user-specified data for transmission to controllable lighting network 420. Controllable lighting network 420 may, however, limit the user's ability to adjust the illumination provided by one or more luminaires associated with itself. For example, for security reasons, the controllable lighting network may not allow users to adjust the illumination of one or more luminaires.

According to various embodiments of system 400, the lighting control application is launched only after the user of personal device 410 authorizes the launching of the lighting control application. In some embodiments of system 400, the user is first notified that controllable lighting network 420 has been detected in the user's vicinity, before the user's authorization to launch the lighting control application is sought. In such embodiments, a variety of techniques may be used to notify the user of the detection of controllable lighting network 420 in the user's vicinity. For example, personal device 410 may beep, vibrate or present the user with a text or graphical message to indicate the detection of controllable lighting network 420.

Figure 5:
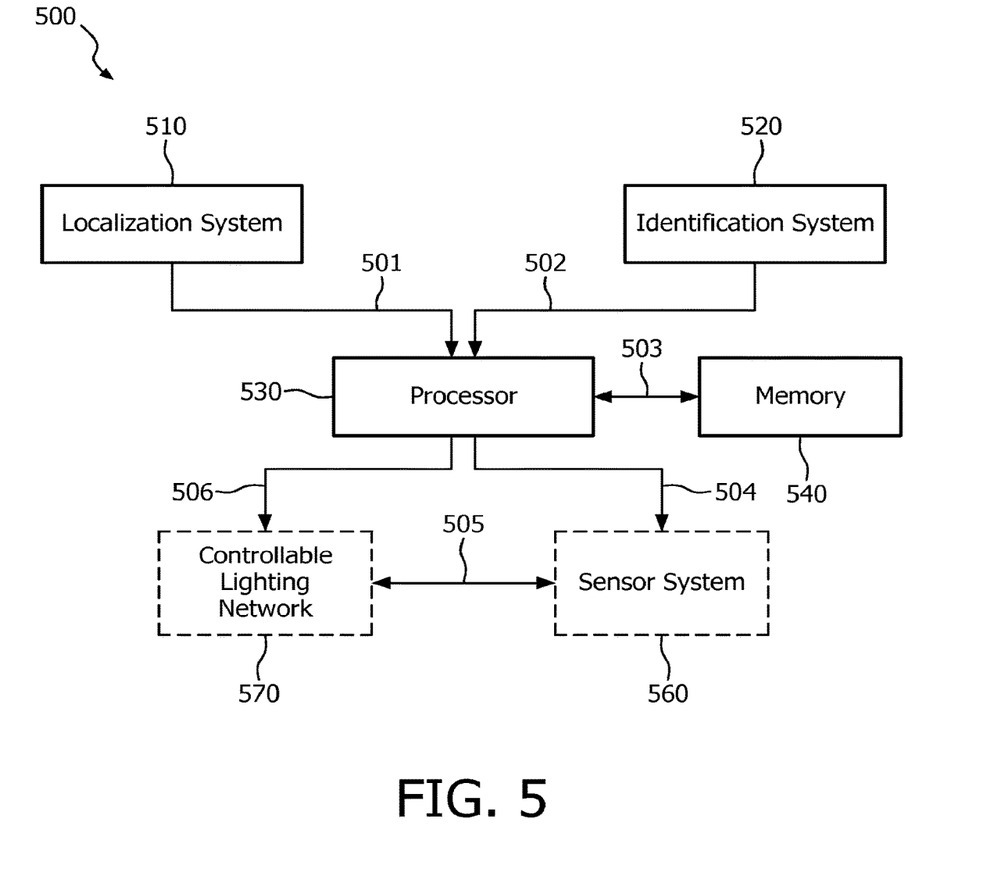
FIG. 5 illustrates a system for managing interaction with a controllable lighting network according to embodiments of the invention that include a localization system and an identification system.

FIG. 5 illustrates a system 500 for managing interaction with a controllable lighting network according to embodiments of the invention. System 500 comprises localization system 510, identification system 520, processor 530, and memory 540. System 500 may also include sensor system 560, and controllable lighting network 570.

In many embodiments of system 500, localization system 510 determines location data associated with a user, and transmits, via link 501, a signal indicative of the location data. Identification system 520 determines a user identifier associated with the user, and transmits, via link 502, a signal indicative of the user identifier. Localization system 510 may be any type of localization system described with respect to localization system 220 of FIG. 2. Identification system 520 may be any type of identification system described with respect to identification system 230 of FIG. 2. Memory 540 may associate user identifiers with user preference data. Memory 540 may be any type of memory described with respect to memory 110 of FIG. 1. Processor 530 may be any type of processor described with respect to processor 120 of FIG. 1. Likewise, controllable lighting network 570 may be any type of controllable lighting network described with respect to controllable lighting network 130 of FIG. 1. Sensor system 560 includes any system used by controllable lighting networks such as controllable lighting network 570 to gather information related to the physical environment. For example, sensor system 560 may utilize sensors such as motion sensors and light sensors to detect movement and changes in lighting associated with a physical space.

According to many embodiments of system 500, processor 530 receives the signal indicative of the user's location data via link 501, and extracts the user's location data from the signal. Processor 530 also receives, via link 502, the signal indicative of the user identifier associated with the user, and extracts the user identifier from the signal. Processor 530 also retrieves, via link 503, from memory 540, user preference data associated with the user's identifier. The user preference data associated with the user's identifier may include the user's selected interactivity level. Processor 530 may also determine which of the user's preference data is authorized for transmission to controllable lighting network 570 by the user's selected interactivity level. Processor 530 may additionally generate a signal indicative of the user's preference data that is authorized for transmission to controllable lighting network 570. As used herein, the term "preference data" refers generally to the types of data described with reference to user preference data 110-2 of FIG. 1. Likewise, as used herein, the term "selected interactivity level" refers generally to the types of data described with reference to selected interactivity level 110-3 of FIG. 1.

According to various embodiments of system 500, sensor system 560 may receive, via link 504, the signal indicative of the authorized preference data before transmitting the signal, via link 505, to controllable lighting network 570. In other embodiments of system 500, controllable lighting network 570 may receive, via link 506, the signal indicative of the authorized user preference data. According to some embodiments of system 500, system 500 may comprise one or both of sensor system 560 and controllable lighting network 570. According to other embodiments of system 500, system 500 may not comprise either sensor system 560 or controllable lighting network 570.

Many embodiments of system 500 may include a personal mobile electronic communication device proximate to the user. The personal mobile electronic communication device may be any type of device described with respect to personal device 210 of FIG. 2. In such embodiments, the localization system may determine location-related data associated with the personal mobile electronic communication device and use such location-related data to determine the user's location data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising:
   a memory for associating a user identifier with user preference data, the user preference data comprising a selected interactivity level; and
   a processor configured to retrieve from the memory the user preference data associated with the user identifier, checking which user preference data the selected interactivity level authorizes for transmission to a controllable lighting network, and generating a signal indicative of the user preference data authorized for transmission to the controllable lighting network by the selected interactivity level,
   wherein the user identifier corresponds to a user, and the selected interactivity level identifies an authorized level of access to the user identifier and the user preference data by the controllable lighting network, wherein the system is configured to provide:
   a first level denying the controllable lighting network access to the user preference data;
   a second level granting the controllable lighting network access to the user identifier, denying the controllable lighting network access to the user preference data, and indicating that the controllable lighting network will not control lighting based on presence of the user;
   a third level granting the controllable lighting network access to the user identifier and the user preference data, and indicating that the controllable lighting network will control lighting in a vicinity of the user based on the user preference data associated with the user identifier;
   a fourth level granting the controllable lighting network access to the user identifier and the user preference data, and indicating that the controllable lighting network will control lighting within a region associated with the controllable lighting network based on the user preference data associated with the user identifier; and
   a fifth level granting the controllable lighting network access to the user identifier and the user preference data, indicating that the user is able to control the lighting within the region associated with the controllable lighting network, and additionally indicating that the user is able to alter the user preference data.

2. The system of claim 1, wherein:
   the first level is an OFF level;
   the second level is an IGNORE level;
   the third level is a PERSONAL level;
   the fourth level is a BROADCAST level; and
   the fifth level is an ADJUST level.

3. The system of claim 1, further comprising an identification system for determining the user identifier associated with the user, for determining the interactivity level associated with the user, for transmitting a signal indicative of the user identifier, and for transmitting a signal indicative of the interactivity level; wherein the processor is further configured:
   to receive the signal indicative of the user identifier,
   to extract the user identifier from the signal indicative of the user identifier,
   to receive the signal indicative of the interactivity level,
   to extract the interactivity level from the signal indicative of the interactivity level, and
   to update the interactivity level associated with the user identifier in the memory.

4. The system of claim 3, wherein the identification system determines the user identifier associated with the user by utilizing techniques for recognizing unique characteristics of the user and checking another memory for a user identifier associated with the unique characteristics.

5. The system of claim 1, further comprising:
   a localization system for determining user location data associated with the user, and transmitting a signal indicative of the user location data;
   wherein the processor is further configured:
   to receive the signal indicative of the user location data,
   to extract the user location data from the signal indicative of the user location data,
   to check whether the selected interactivity level authorizes the user location data for transmission to the controllable lighting network, and
   to generate a signal indicative of the user location data when authorized by the selected interactivity level.

6. The system of claim 5, wherein the localization system further determines a gaze direction associated with the user by utilizing technologies comprising orientation sensors and technologies for tracking the user's pupil and transmits a signal indicative of the gaze direction; and
   wherein the processor is further configured:
   to receive the signal indicative of the gaze direction,
   to extract the gaze direction from the signal indicative of the gaze direction,
   to check whether the selected interactivity level authorizes transmission of the gaze direction, and
   to generate a signal indicative of the gaze direction when authorized by the selected interactivity level.

7. The system of claim 5, wherein the localization system determines the user location data using technologies comprising at least one of triangulation, accelerometer technology, GPS technology, and A-GPS technology.

8. The system of claim 5, further comprising a personal mobile electronic communication device proximate to the user for communicating with the localization system,
   wherein the localization system determines location-related data associated with the personal mobile electronic communication device; and
   wherein the localization system determines the user location data associated with the user based on the location-related data associated with the personal mobile electronic communication device.

9. The system of claim 8, wherein the personal mobile electronic communication device comprises the localization system; and wherein the localization system determines the user location data by utilizing techniques comprising:

periodically polling one or more Wi-Fi access points,
receiving first data indicative of one or more identities corresponding to the one or more Wi-Fi access points, and
receiving second data associating the one or more identities with one or more signal strengths.

10. The system of claim 8, further comprising:
a presence detection system for detecting the controllable lighting network;
wherein a lighting control application is launched on the personal mobile electronic communication device upon the presence detection system detecting the controllable lighting network;
wherein the lighting control application comprises one or more user interfaces for modifying the user preference data;
wherein the lighting control application receives user-specified data comprising modified user preference data;
wherein the lighting control application transmits a first signal indicative of the user-specified data; and
wherein the processor receives the first signal, extracts the user-specified data, updates the user preference data in the memory using the user-specified data, checks which user preference data the selected interactivity level authorizes for transmission to a controllable lighting network, and generates a signal indicative of the user preference data authorized for transmission to the controllable lighting network by the selected interactivity level.

11. The system of claim 10, wherein the lighting control application further comprises one or more user interfaces for controlling one or more luminaires associated with the controllable lighting network, and receives user-specified data comprising data indicative of one or more luminaires and one or more preferred illumination settings associated with the one or more luminaires; and wherein the processor is further configured to receive the first signal, to extract the user-specified data, to check whether the selected interactivity level authorizes alteration of luminaire settings by the user, and to generate a signal indicative of the user-specified data for transmission to the controllable lighting network when alteration of luminaire settings is authorized by the selected interactivity level.

12. The system of claim 10, wherein the user preference data comprises a set of known controllable lighting networks; and wherein the presence detection system detecting the controllable lighting network comprises identifying the controllable lighting network in the set of known controllable lighting networks.

13. A system comprising:
a localization system for determining user location data associated with a user, and for transmitting a first signal indicative of the user location data;
an identification system for determining a user identifier associated with the user, and for transmitting a second signal indicative of the user identifier;
a memory for associating the user identifier with user preference data; and
a processor configure to receive the first signal and to extract the user location data, to receive the second signal and to extract the user identifier, to retrieve from the memory the user preference data associated with the user identifier, to check which user preference data a selected interactivity level authorizes for transmission to a controllable lighting network, and to generate a signal indicative of the user preference data authorized for transmission to the controllable lighting network by the selected interactivity level,
wherein the system is configured to provide:
a first level denying the controllable lighting network access to the user preference data;
a second level granting the controllable lighting network access to the user identifier, denying the controllable lighting network access to the user preference data, and indicating that the controllable lighting network will not control lighting based on presence of the user;
a third level granting the controllable lighting network access to the user identifier and the user preference data, and indicating that the controllable lighting network will control lighting in a vicinity of the user based on the user preference data associated with the user identifier;
a fourth level granting the controllable lighting network access to the user identifier and the user preference data, and indicating that the controllable lighting network will control lighting within a region associated with the controllable lighting network based on the user preference data associated with the user identifier; and
a fifth level granting the controllable lighting network access to the user identifier and the user preference data, indicating that the user is able to control the lighting within the region associated with the controllable lighting network, and additionally indicating that the user is able to alter the user preference data.

14. The system of claim 13, further comprising a personal mobile electronic communication device proximate to the user for communicating with the localization system,
wherein the localization system determines location-related data associated with the personal mobile electronic communication device; and
wherein the localization system determines the user location data associated with the user based on the location-related data associated with the personal mobile electronic communication device.

15. The system of claim 13, wherein:
the first level is an OFF level;
the second level is an IGNORE level;
the third level is a PERSONAL level;
the fourth level is a BROADCAST level; and
the fifth level is an ADJUST level.

16. A method for managing interaction with controllable lighting networks comprising:
presenting a selection of preference data on a personal mobile electronic communication device, wherein the personal mobile electronic communication device is configured to provide
a first level denying a controllable lighting network access to user preference data;
a second level granting the controllable lighting network access to user identifier, denying the controllable lighting network access to the user preference data, and indicating that the controllable lighting network will not control lighting based on presence of the user;
a third level granting the controllable lighting network access to the user identifier and the user preference data, and indicating that the controllable lighting network will control lighting in a vicinity of the user based on the user preference data associated with the user identifier;
a fourth level granting the controllable lighting network access to the user identifier and the user preference data, and indicating that the controllable lighting network will control lighting within a region associated with the controllable lighting network based on the user preference data associated with the user identifier; and a fifth level granting the controllable lighting network access to the user identifier and the user preference data, indicating that the user is able to control the lighting within the region associated with the controllable lighting network, and additionally indicating that the user is able to alter the user preference data;

receiving modified preference data associated with the presented selection of preference data;

transmitting the modified preference data to a processor, the processor checking a memory for an authorization to transmit the modified preference data to a controllable lighting network; and transmitting the modified preference data to the controllable lighting network when the authorization to transmit the modified preference data to the controllable lighting network exists.

17. The method of claim 16, wherein:
the first level is an OFF level;
the second level is an IGNORE level;
the third level is a PERSONAL level;
the fourth level is a BROADCAST level; and
the fifth level is an ADJUST level.

* * * * *